(12) United States Patent
Meter

(10) Patent No.: US 11,516,995 B2
(45) Date of Patent: Dec. 6, 2022

(54) EGG TRAY FOR SUPPORTING EGGS IN AN INCUBATION CHAMBER

(71) Applicant: HatchTech Group B.V., Veenendaal (NL)

(72) Inventor: Tjitze Meter, Rhenen (NL)

(73) Assignee: HatchTech Group B.V., Veenendaal (NL)

( * ) Notice: Subject to any disclaimer, the term of this patent is extended or adjusted under 35 U.S.C. 154(b) by 0 days.

(21) Appl. No.: 15/734,564

(22) PCT Filed: Jun. 12, 2019

(86) PCT No.: PCT/NL2019/050355
§ 371 (c)(1),
(2) Date: Dec. 3, 2020

(87) PCT Pub. No.: WO2019/240576
PCT Pub. Date: Dec. 19, 2019

(65) Prior Publication Data
US 2021/0227799 A1     Jul. 29, 2021

(30) Foreign Application Priority Data
Jun. 15, 2018   (NL) ................................. NL2021127

(51) Int. Cl.
A01K 41/06     (2006.01)
(52) U.S. Cl.
CPC .................................. A01K 41/065 (2013.01)

(58) Field of Classification Search
CPC ..................................................... A01K 41/06
USPC ................. 119/322, 323, 324, 325, 326, 327
See application file for complete search history.

(56) References Cited

U.S. PATENT DOCUMENTS

| 3,003,463 A | 10/1961 | De Rijcke |
| 3,958,711 A | 5/1976 | Morris et al. |
| 8,820,519 B2 | 9/2014 | Möller |
| 9,445,579 B2 * | 9/2016 | Aangenendt ......... A01K 41/065 |
| 2015/0075440 A1 | 3/2015 | Aangenendt |

FOREIGN PATENT DOCUMENTS

| EP | 0375020 A1 | 6/1990 |
| WO | WO-0203785 A1 * | 1/2002 ........... A01K 41/065 |

* cited by examiner

*Primary Examiner* — Joshua J Michener
*Assistant Examiner* — Nicole Paige Maccrate
(74) *Attorney, Agent, or Firm* — N.V. Nederlandsch Octrooibureau

(57) ABSTRACT

Egg tray (1) for supporting eggs in an incubation chamber, the egg tray comprising a first grid (10) extending in a bottom plane (P), the first grid comprising one or more adjacent rows with slanted ribs extending from one side of the row to the other to form a plurality of adjacent openings (13), wherein an opening (13) defines an egg accommodation, wherein the ribs are configured for contacting an egg at a middle part (14) of the ribs between two rib ends in order to support an egg in the egg accommodation.

16 Claims, 5 Drawing Sheets

EGG TRAY FOR SUPPORTING EGGS IN AN INCUBATION CHAMBER

TECHNICAL FIELD

The invention relates to an egg tray for supporting eggs in an incubation chamber, and to a method for incubating a plurality of eggs.

BACKGROUND ART

An egg tray for containing a number of eggs in an incubation chamber is known from patent application WO 2016/018154 by Meter at HatchTech. This egg tray comprises egg accommodation spaces which surround the eggs for a relatively large surface area. Furthermore, the number of eggs that can be accommodated in the tray could be improved.

An egg tray comprised in a hatching drawer is known from patent document U.S. Pat. No. 3,003,463 by De Rijcke. This egg tray comprises grids with square meshes, wherein each grid is formed from parallel wires which are soldered to the frame. This egg tray can accommodate a limited number of eggs. The wire grids may damage the eggs and the square mesh openings allows only eggs from a specific size to be stably supported in the trays.

SUMMARY OF THE INVENTION

It would be desirable to provide an egg tray which at least reduces at least one of the problems described above. Furthermore, it would be desirable to provide an egg tray which allows for accommodating a large number of eggs per unit volume and/or which improves air flow and ventilation and/or which is more flexible in terms of the size of the eggs that can be accommodated in a stable manner while minimizing contact area with the egg.

Therefore, according to an aspect of the invention, there is provided an egg tray for supporting eggs in an incubation chamber, the egg tray comprising a first grid extending in a bottom plane, the first grid comprising one or more adjacent rows with slanted ribs extending from one side of the row to the other to form a plurality of adjacent openings, wherein an opening defines an egg accommodation, wherein the ribs are configured for contacting an egg at a contact area of the ribs between two rib ends in order to support an egg in the egg accommodation.

The contact area may be a contact face at a middle part of a rib. The contact area may have one contact face. It is however conceivable that a rib has two opposite contact faces to provide a multi point support, like a six-point support in case of a triangular opening. The middle part of the ribs may be in itself unsupported, i.e. are only connected to the grid via both rib ends, in other words the rib is free hanging. Such a free hanging rib further improves ventilability of the tray. In use, the eggs can be supported at a minimum of three contact points, which is the bare minimum for a stable support. Therefore, the egg's surface area that is available for ventilation is optimized. Since the egg tray has little material, the air can flow relatively freely, which accounts for improved heating and/or cooling of the eggs. Furthermore, having rows with slanted ribs allows for a rigid shape which uses little material. In addition, the ribs allow to accommodate dimensional deviations of eggs. The first grid may form the bottom of the tray. Thus substantially the entire tray extends in the bottom plane or at an upper side of the bottom plane.

At least one opening defines an egg accommodation, and is adapted to receive an egg of any size, as long as it is large enough to not fall through the openings. The first grid may have a rectangular shape projected in the bottom plane, although also other shapes may be conceivable. The first grid may be surrounded by a circumferential frame wall. The shape of the first grid is such that the number of eggs per unit volume in the incubation chamber is optimized. To this end, the egg accommodation coverage of the bottom plane is optimized, and the vertical space that is not used for egg accommodation is minimized, for example by reducing the distance of the grid components extending below the eggs. The ribs are thick enough to support the weight of an egg, but provided that this is the case, they are kept as narrow as possible. Narrower ribs account for less material use, lighter trays, and more air flow being possible through the tray, enabling better ventilation of the eggs when in use. Furthermore, narrower ribs reduce the amount of dirt that can accumulate in the tray during use. Typical widths of the ribs are 2 to 6 mm, typically 3 mm. Ribs are slanted and extend from one side of the row to the other side of the row to form a plurality of adjacent openings. In other words, ribs are slanted in a row direction. The row direction is the direction in which the row extends lengthwise in the bottom plane. It will be clear that not all ribs are slanted. Some of the ribs delimit the row and extend in the row direction, and are aligned with the row direction.

According to an embodiment, every other opening in a row defines an egg accommodation.

Adjacent openings may not both be able to accommodate an egg, as they share a typically narrow rib, which can support an egg at only one side. Therefore, every second opening in a row is adapted to accommodate an egg, such that the number of eggs that can be supported by a tray is about 50% of the number of openings. In an embodiment, a tray with 171 triangular openings in the first grid comprises 88 egg accommodations.

According to an embodiment, the ribs are substantially straight. In other words, the ribs do not have a curved shape. This provides efficient material use and rigidity. In addition, the straight ribs can be aligned easily in the first grid. In this context, 'substantially straight' means that the maximum transverse deviation from a straight line between the rib ends is less than 20% of the distance between the rib ends, preferably less than 10%.

According to an embodiment, the openings are defined by three ribs and the openings have a substantially triangular shape, when projected in the bottom plane. The triangular shape of the openings provides stiffness to the tray.

A person skilled in the art will understand that triangular shapes with slight deviations from the mathematical triangular shape will result in the same effects, and are thus intended to be part of the scope of the invention. For this reason, 'substantially triangular' means that for each rib of the triangle the maximum transverse deviation from a straight line between the triangle corners is less than 20% of the respective distance between the triangle corners, preferably less than 10%. It will be understood that openings at the edge of the first grid may have a different shape than the triangle. The typical shape that is referred to is related to all openings that are located away from the edge of the first grid. It will be clear that it is conceivable for some openings of the tray to have a different shape than the triangular shape.

According to an embodiment, the egg tray further comprises a second grid, attached to the first grid, wherein the second grid is adapted to provide additional support to eggs when the tray is tilted. The openings of the second grid have a loose fit with an egg in the egg accommodation to further improve ventilability of the tray while still providing support to an egg when the tray is tilted. The clearance of the loose fit between the egg and the opening of the second grid may be several millimeters.

The second grid may have a rectangular shape, when projected in the bottom plane. The second grid may be surrounded by a circumferential frame, or embedded in the frame that surrounds the first grid.

According to an embodiment, the second grid is spaced in a direction perpendicular to the bottom plane with respect to the first grid such that the second grid provides support to eggs when the tray is tilted. Preferably, the edges or frames of the first and second grids are thus mutually aligned in the direction perpendicular to the bottom plane, i.e. precisely above each other.

According to an embodiment, the openings of the second grid have a different shape with respect to the openings of the first grid. This allows for saving of material use and/or improved rigidity. This allows also to separate functions of defining positions of eggs by the first grid, and maintaining orientation of the eggs within limits by the second grid.

According to an embodiment, the openings of the second grid are aligned with the egg accommodations to co-define these. This way, eggs in accommodations have defined positions and maintain orientation within limits. The openings of the second grid are aligned with and slightly larger than the openings of the first grid. In this way, introduction of an egg in the egg accommodation is facilitated. The eggs that are supported by the first grid can be placed in their egg accommodations through the openings of the second grid, such that each opening of the second grid co-defines an egg accommodation, i.e. is adapted to receive an egg.

According to an embodiment, the second grid comprises openings which have a substantially hexagonal shape, when projected in the bottom plane.

A person skilled in the art will understand that hexagonal shapes with slight deviations from the mathematical hexagonal shape will result in the same effects, and are thus intended to be part of the scope of the invention. For this reason, 'substantially hexagonal' means that for each rib of the hexagon the maximum transverse deviation from a straight line between the hexagon's corners is less than 20% of the respective distance between the hexagon's corners, preferably less than 10%. It will be understood that openings at the edge of the second grid may have a different shape than the hexagon, like in particular a square of pentagon shape. The typical shape that is referred to is related to all openings that are located away from the edge of the first grid. Some of the openings at the edge of the second grid may be pentagonal.

According to an embodiment, the first grid and the second grid are connected by connection members that extend between the first grid and the second grid and are configured to define a spacing D2 between the first grid and the second grid. As an option, connection members extend from the rib ends in the first grid to vertices, or in other words nodes, of the openings in the second grid.

There may be a vertical connection between every rib end in the first grid to an opposite vertex in the second grid, such that 50% of the vertices is connected to a connection member. The number of separate connection members may be between two times and four times the number of egg accommodations, or about three times the number of egg accommodations.

According to an embodiment of the egg tray the grid spacing D2 is configured such that the second grid prevents an egg from tilting out of the egg accommodation associated with the egg.

According to an embodiment of the egg tray, an opening of the first grid has an inscribed circle, with an inner diameter ID1, and an opening of the second grid has an inscribed circle, with an inner diameter ID2, and wherein the ratio between ID1 and ID2 is between 0.4 to 0.6, and wherein the ratio between ID1 and the grid spacing D2 is between 0.7 to 1.7.

These ratios between ID1 and ID2 and between ID1 and the grid spacing D2 make the tray suitable for eggs with different dimensions like eggs originating form chickens, turkeys, birds etc.

According to an embodiment, the egg tray is adapted to receive smaller eggs and larger eggs in the egg accommodations, wherein a first distance between the first grid and a thickest part of a larger egg is larger than a grid spacing D2 between the first grid and the second grid, wherein the first distance and the grid distance are defined in a plane perpendicular to the bottom plane.

In this way, preferably, the grid spacing D2 is between 10 mm and 50 mm, In a tray suitable for chicken eggs, the grid spacing D2 is preferably between 15 mm and 20. In this way, smaller eggs will fit completely through the openings of the second grid, while larger eggs will fit through it for a distance which is sufficient to be supported by the first grid, although the thickest part of the egg may stay above the second grid. Note that for smaller eggs the thickest part may be located at the same height as the second grid or even below the second grid.

According to an embodiment of the egg tray, the inner diameter ID1 is between 20 to 28 mm and the inner diameter ID2 is between 40 to 50 mm. This makes the tray in particular suitable for chicken eggs.

According to an embodiment, at least one of the ribs comprises a recess that extends between contact faces of the contact area. According to further embodiment, the recess extends between two opposite contact faces of the contact area, and wherein in use an egg contacts both contact faces. This will improve the stability of the egg in the egg accommodation. The recess is typically placed halfway the ribs and may be located only at the side where it can receive an egg. Due to the presence of the recess in a rib, the egg may at this rib be supported by two end points at both sides of the recess. This means that the depth of the recess is sufficient to accommodate the curvature of the egg in between the end points. If all ribs of an egg accommodation in the first grid comprise such a recess, there may thus be six contact points for supporting an egg.

According to an embodiment, the recess is configured such the egg is free-standing with respect to the rib. This improves exposure of the egg to air and makes the tray filled with eggs more ventilateable.

According to an embodiment, the egg tray is adapted to only contact the eggs via the ribs. In other words, no other parts of the egg tray contact the eggs in normal use. Exception may be made in use, when tilting the egg tray over large angles. In this situation the second grid may contact the eggs to prevent the eggs falling out of the egg tray.

According to an embodiment, the egg tray is configured such that empty trays are stackable, for providing a stack of a plurality of empty egg trays.

Additional stacking equipment may be used to stack the tray, for example separate stacking elements that are located in between each two egg trays when they are stacked.

According to an embodiment, the egg tray is made of a polymer, preferably polypropylene or any other suitable polymer.

The polymer needs to be a hard plastic which is able to form an egg tray capable of holding the weight of a plurality of eggs.

According to an embodiment, the egg tray is preferably made in one piece by injection moulding.

Single-piece manufacturing by injection moulding using a template makes fabrication relatively quick and easy and avoids any fabrication steps to attach different components to each other, which may create weak attachment points in the tray.

In an embodiment, the egg tray may have an empty row as a filling piece to adjust the dimension of the tray to an industry standard tray. The empty row may break the pattern of the first grid and thus have a different pattern compared with the first grid.

According to an aspect of the invention, there is provided a method for incubating a plurality of eggs, the method comprising the steps of: placing the eggs in a tray as described herein; tilting the tray with respect to a horizontal.

The egg tray enables manipulation or movement when each egg accommodation has received an egg. This manipulation, e.g. tilting of the tray, is common in industry during the logistic process of the tray filled with eggs, in particular during incubation, to ensure for example an even distribution of the air flow around the eggs over time.

The various aspects discussed in this patent can be combined in order to provide additional advantages.

BRIEF DESCRIPTION OF DRAWINGS

Embodiments will now be described, by way of example only, with reference to the accompanying schematic drawings in which corresponding reference symbols indicate corresponding parts.

The figures are meant for illustrative purposes only, and do not serve as restriction of the scope or the protection as laid down by the claims.

DETAILED DESCRIPTION

Further advantages, features and details of the present invention will be explained in the following description of some embodiments thereof. In the description, reference is made to the attached figures.

Figure 1:
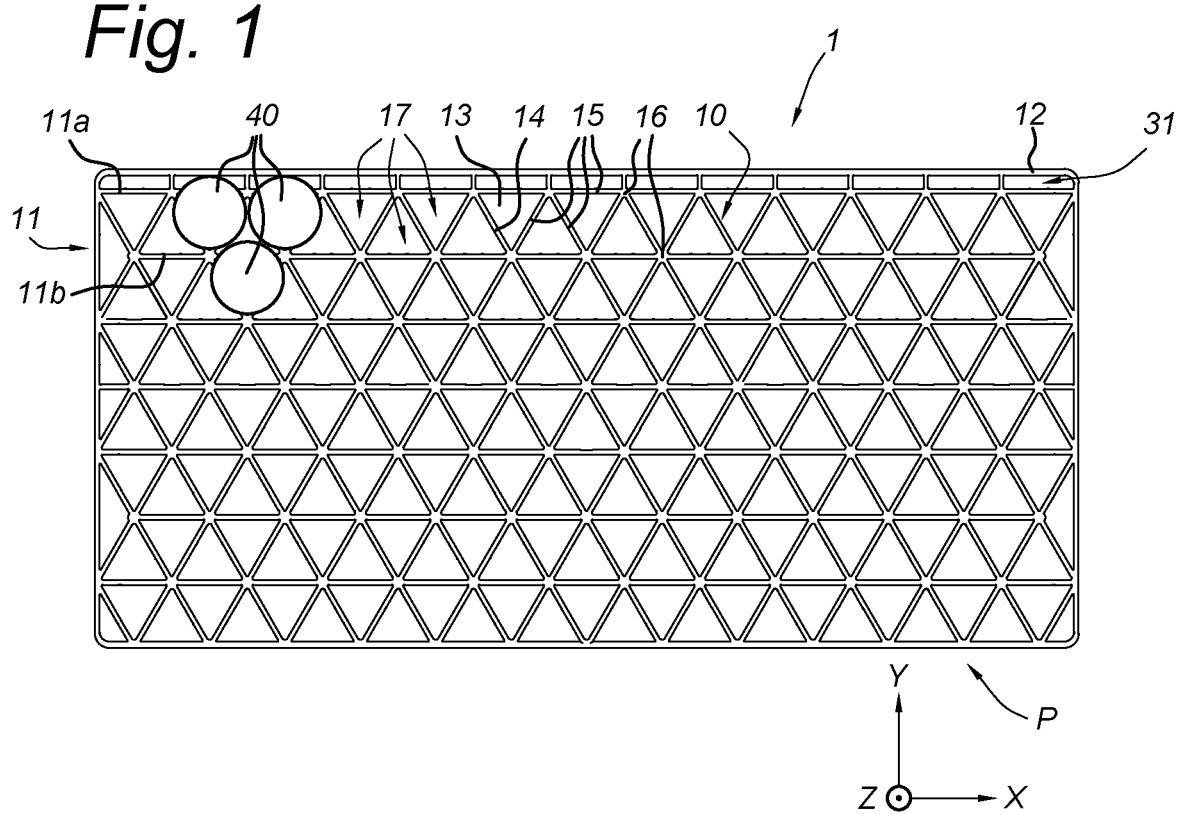
FIG. 1 schematically shows a top view of an egg tray according to an embodiment.

FIG. 1 shows a top view of an egg tray 1 according to an embodiment. The egg tray comprises a first grid 10 surrounded by a frame 12. The first grid 10 comprises rows 11 of slanted ribs 15, which extend from one side 11a to an other side 11b of the rows 11. The ribs 15 are straight and extend between two rib ends 16, in between which a middle part 14 is provided. Three ribs 15, connected at their rib ends 16, together define an opening 13. Every other opening 13 in a row 11 defines an egg accommodation 17. For illustration purpose, a few of the egg accommodations 17 are filled with an egg 40. The first grid 10 extends substantially planar in a bottom plane P, extending in first and second directions X, Y. In use, each egg accommodation may receive an egg (not shown), which is supported by three middle parts 14 of three ribs 15 that surround an opening 13. The tray is intended for use in an incubation chamber which is not shown. This is clear from the large openings that enable to impose a desired climate provided by the incubation chamber onto the interior of the egg tray 1, more specifically onto the egg accommodations 17. The tray 1 comprises a row 31 as a filling piece. This filling piece enables to adjust the dimension of the tray 1 to an industry standard tray.

Figure 2:
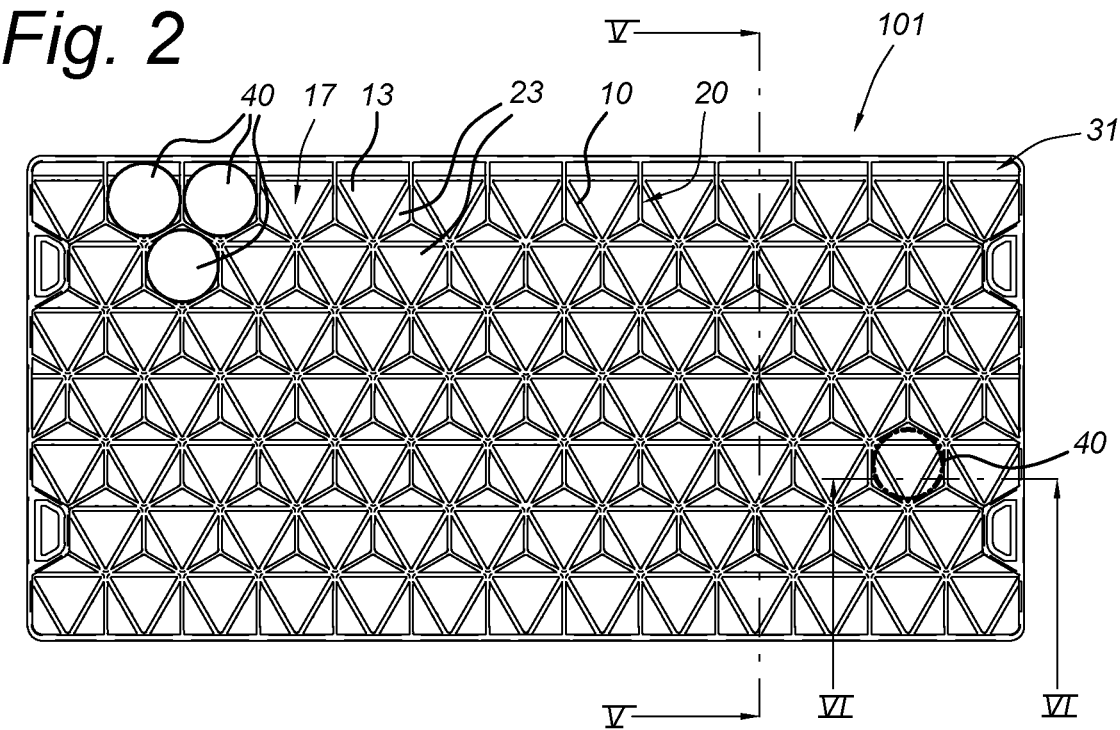
FIG. 2 schematically shows a top view of an egg tray according to an alternative embodiment.

FIG. 2 shows a top view of an egg tray 101 according to an alternative embodiment. The egg tray 101 comprises a first grid 10 and a second grid 20. The first grid 10 comprises triangle-shaped openings 13 and the second grid 20 comprises openings 23 which are typically hexagonally shaped, apart from pentagonal shaped ones adjacent to the edge of the second grid 20. The openings 13, 23 of both grids 10, 20 are aligned so as to together define egg accommodations 17. For illustration purpose, a few of the egg accommodations 17 are filled with an egg 40. In use, one or more eggs 40 are received in egg accommodation spaces 17. A dashed line indicated with VI marks the cross-sectional image of FIG. 6. In use, the openings 13 in the first grid 10 determine the vertical positioning of an egg, while the openings 23 in the second grid 20 provide additional support when tilting the tray 101, in order to prevent the eggs from falling out of the tray 101.

Figure 3:
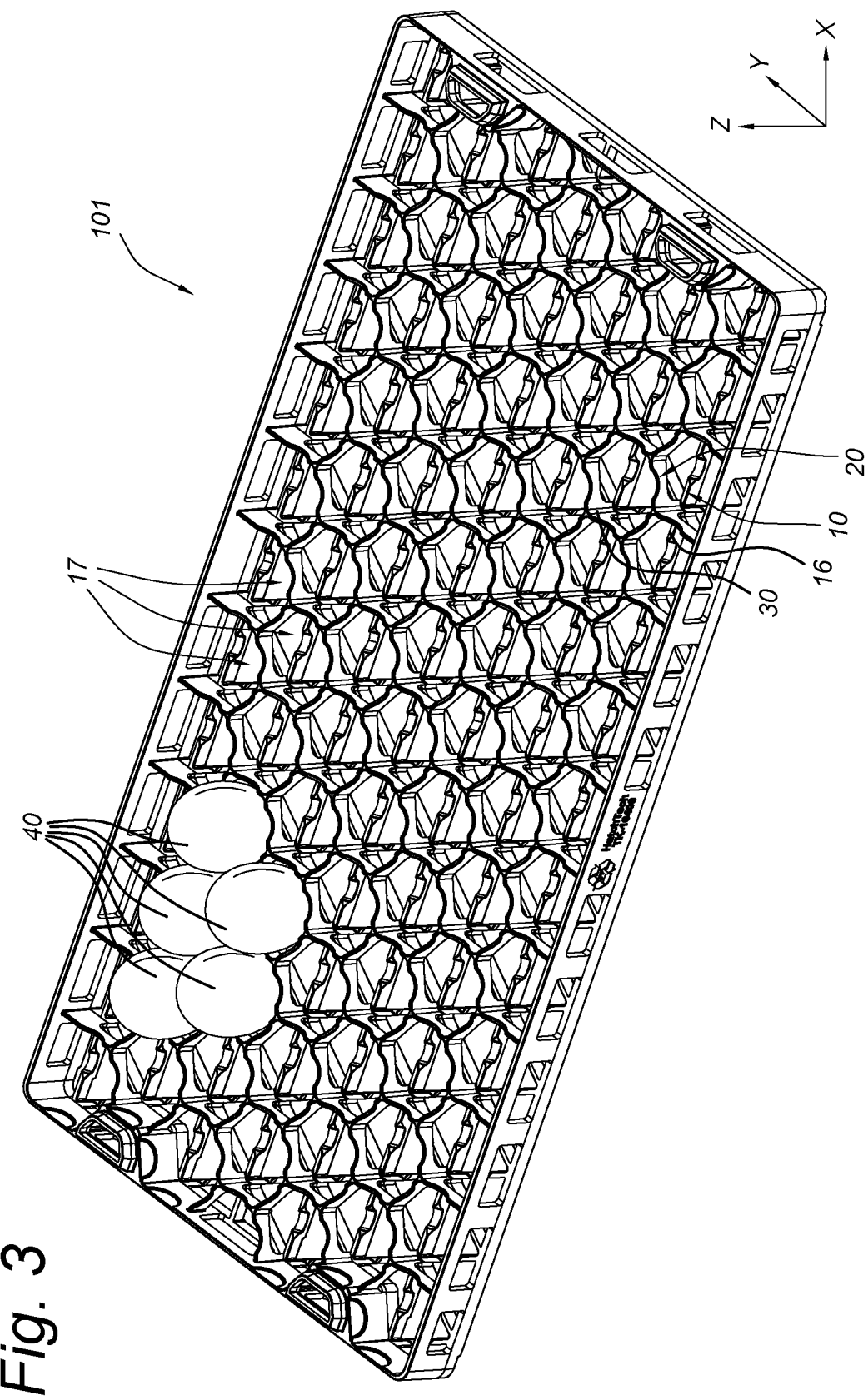
FIG. 3 schematically shows a perspective view of the egg tray of FIG. 2.

FIG. 3 shows a perspective view of the egg tray 101 of FIG. 2. It is shown that the egg tray 101 comprises two grids 10, 20 extending in first and second directions X, Y, which are spaced apart in a third, vertical direction Z. The first grid 10 comprises triangles whereas the second grid 20 comprises hexagons. Connections members 30 connect the first and second grids 10, 20 at a number of discrete positions. The connection members 30 extend vertical and are provided at each point where the rib ends 16 of the first grid 10 come together.

Figure 4:
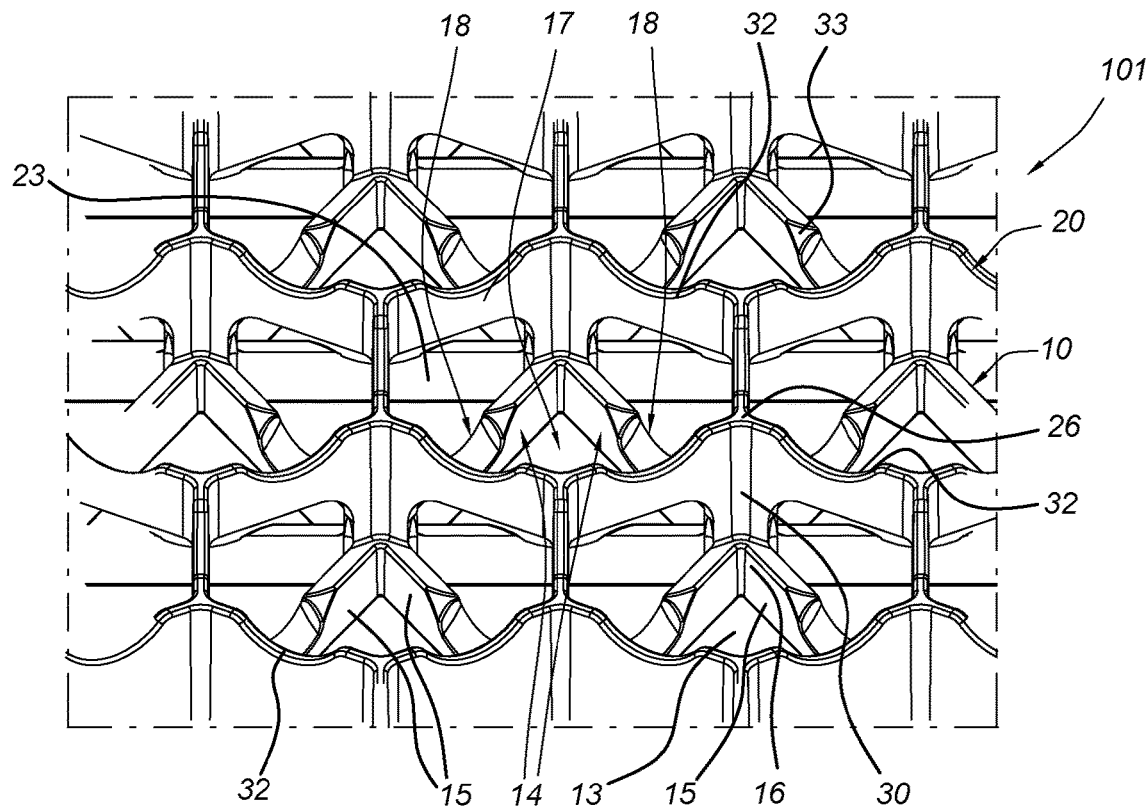
FIG. 4 schematically shows a perspective view of a detail of the egg tray of FIGS. 2-3.

FIG. 4 shows a detailed image of a part of the egg tray 101. The first grid 10 comprises openings 13 defined by three ribs 15. At the middle parts 14 of the ribs 15 of the first grid 10, recesses 18 are provided, which serve to support an egg and keep the egg in place. The recess 18 is described in more detail referring to FIG. 7. The second grid 20 is connected to the first grid 10 using vertical connections 30, which extend from vertices 26 at the corners of the hexagonal openings 23 in the second grid 20 to the points where the rib ends 16 of the first grid 10 come together. In this way, at each egg accommodation the parts of the first and second grid 10, 20 surrounding the triangular opening 13 and the hexagonal opening 23 are connected by three vertical connections 30. This allows for a stable egg tray 101 which can withstand the weight of the eggs. At the middle parts of the ribs 15 of the second grid 10, a cut out 32 is provided. The cut out 32 facilitates tilting of an egg within the accommodation 17. At the same time, the cut out 32 assures a good contact area for an egg, that is not sharp, or harmful in any other way to the egg.

Figure 5:
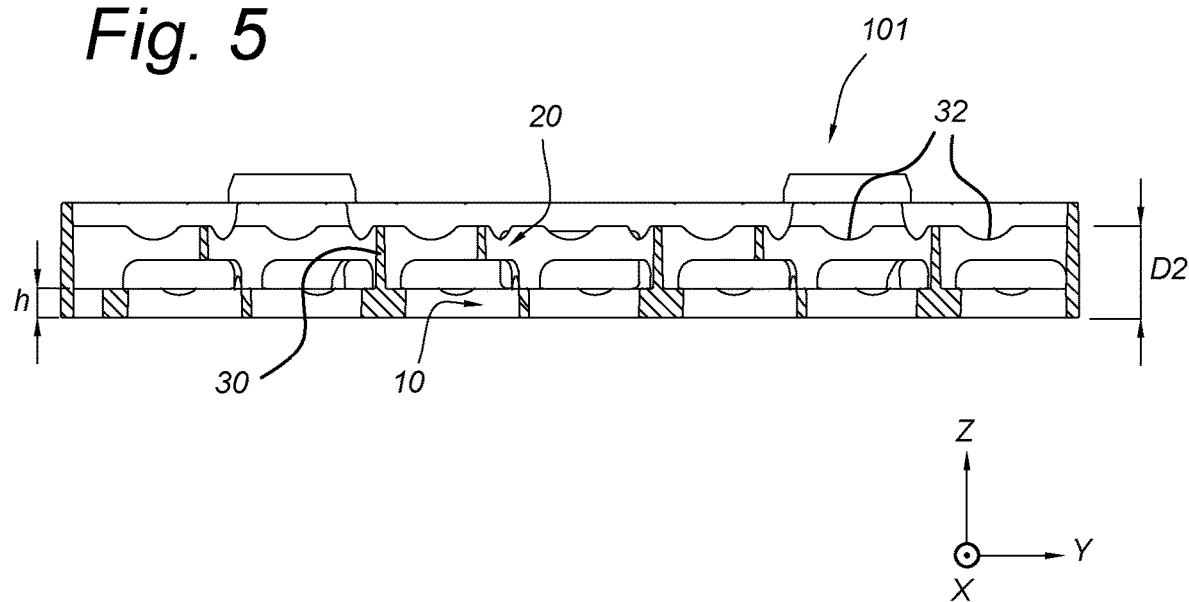
FIG. 5 schematically shows a side view in cross section of the egg tray of FIGS. 2-4.

FIG. 5 shows a perspective side view of the egg tray 101. The first grid 10 and second grid 20 are separated by a grid spacing D2, a distance which is bridged by the vertical connection members 30. The egg tray 101 is largely open to allow air to flow through freely and enable good ventilation for the eggs when in use.

Figure 6:
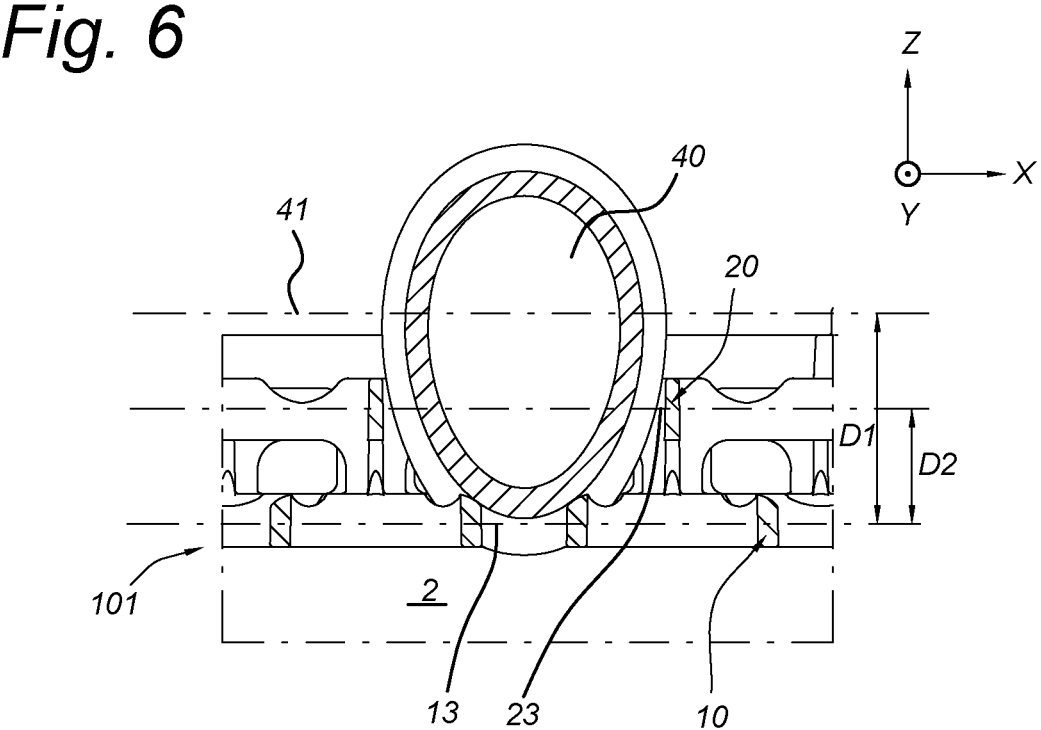
FIG. 6 schematically shows a detail as indicated in FIG. 2 in a cross-sectional side view.

FIG. 6 shows a cross-sectional image of a part of FIG. 2, as indicated therein by the dashed line marked with VI. The egg tray 101 is placed in an incubation chamber 2, and accommodates a large egg 40. As the grid spacing D2 is defined between the first grid 10 and the second grid 20, the first distance D1 is defined between the first grid 10 and the thickest part 41 of the large egg 40. In this way, a large egg 40 may fit in the egg tray 101 even when the thickest part 41 is slightly larger than the width of the hexagonal opening 23.

Figure 7:
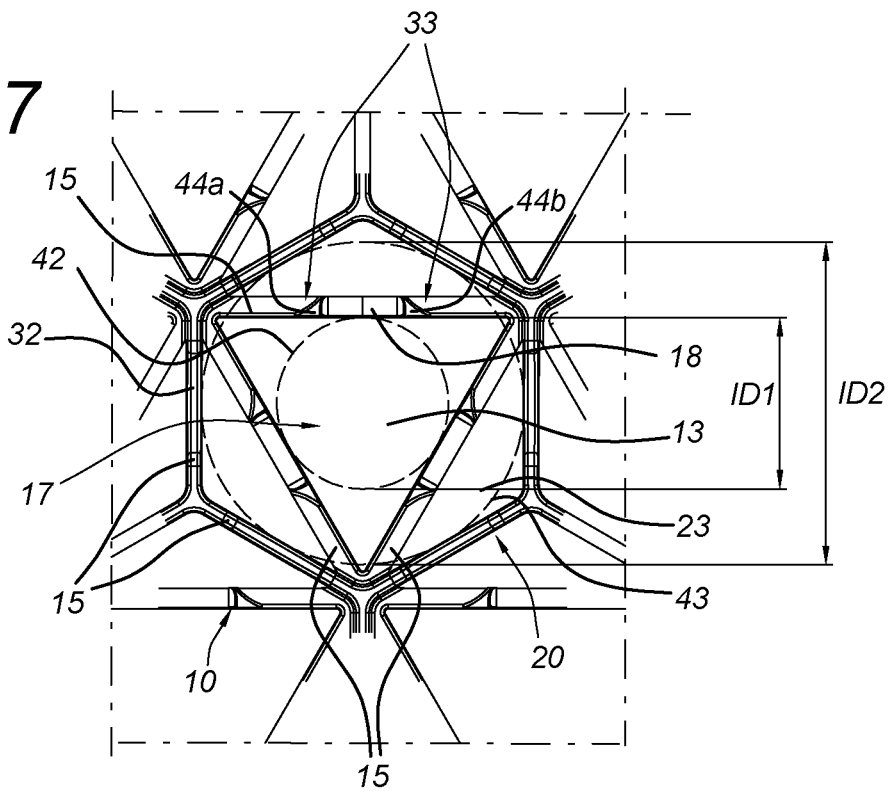
FIG. 7 shows in top view a detail of the tray of FIG. 2.

FIG. 7 shows a single accommodation 17 of the egg tray 101 of FIG. 2. The opening 13 of the first grid 10 has an inscribed circle 42, with an inner diameter ID1. The opening 23 of the second grid 20 has an inscribed circle 43, with an inner diameter ID2. The ratio between ID1 and ID2 is between 0.4 to 0.6. The ratio between ID1 and the grid spacing D2 as shown in FIGS. 5 and 6 is between 0.7 to 1.7. the inner diameter ID1 is between 20 to 24 mm and the inner diameter ID2 is between 37 to 47 mm. 16.

The middle parts 14 of the ribs 15 of the first grid 10 comprise a recess 18. The contact faces 44a, 44b are configured for supporting an egg. The recess 18 is configured such the egg is free-standing with respect to the rib 15. The recess 18 extends between two opposite contact faces 44a, 44b of the contact area 33.

Figure 8:
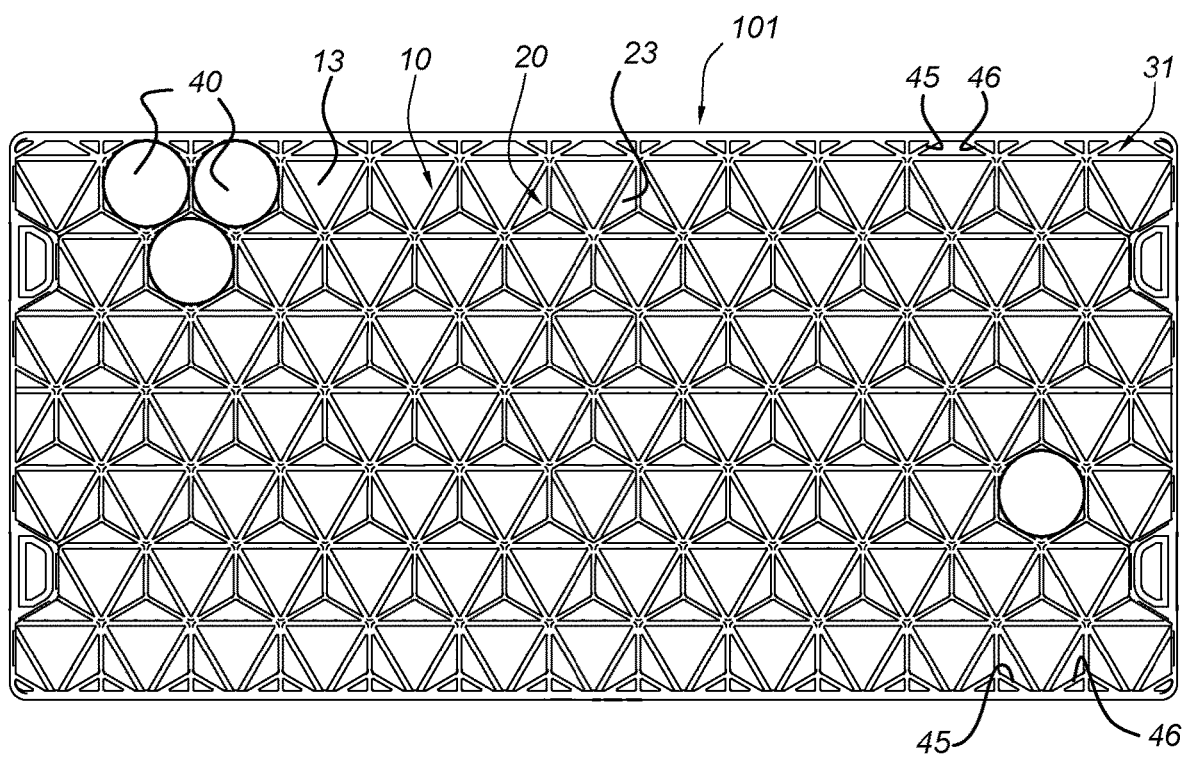
FIG. 8 shows a top view of an egg tray according to a further alternative embodiment.

FIG. 8 shows a top view of an egg tray 101 according to a further alternative embodiment. The egg tray 101 comprises the first grid 10 and the second grid 20. The first grid 10 comprises triangle-shaped openings 13 and the second grid 20 comprises openings 23 which are hexagonally shaped. For illustration purpose, a few of the egg accommodations 17 are filled with an egg 40. The tray 101 differs with the tray in FIG. 2 in that the opposite sides of the tray 101 are provided with reinforcing ribs 45, 46. The reinforcing ribs 45, 46 are arranged such that the second grid 20 continuous to extend towards the sides with the hexagonal shaped openings 23 or grid cell. The filling piece 31 therefore is in effect reinforced by the reinforcing ribs 45, 46.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. It will be apparent to the person skilled in the art that alternative and equivalent embodiments of the invention can be conceived and reduced to practice. All changes which come within the meaning and range of equivalency of the claims are to be embraced within their scope.

The invention claimed is:

1. An egg tray for supporting eggs in an incubation chamber, the egg tray comprising:
a first grid extending in a bottom plane (P), the first grid comprising one or more adjacent rows with substantially straight ribs which are slanted and extend from one side of the row to the other side of the row to form a plurality of adjacent openings, wherein every other opening in the row defines an egg accommodation, wherein the ribs are configured for contacting an egg at a contact area of the ribs between two rib ends in order to support an egg in the egg accommodation, wherein the openings are defined by three ribs and the openings have a substantially triangular shape, when projected in the bottom plane (P), wherein the egg tray further comprises a second grid, attached to the first grid, wherein the second grid is adapted to provide additional support to eggs when the tray is tilted, wherein the openings of the second grid are aligned with the egg accommodations to co-define the egg accommodations.

2. The egg tray according to claim 1, wherein the second grid is spaced in a direction perpendicular to the bottom plane (P) with respect to the first grid such that the second grid provides support to eggs when the tray is tilted.

3. The egg tray according to claim 1, wherein the openings of the second grid have a different shape with respect to the openings of the first grid.

4. The egg tray according to claim 1, wherein the second grid comprises openings which have a substantially hexagonal shape, when projected in the bottom plane (P).

5. The egg tray according to claim 1, wherein the first grid and the second grid are connected by connection members that extend between the first grid and the second grid and are configured to define a grid spacing (D2) between the first grid and the second grid, wherein the grid distance is defined in a plane perpendicular to the bottom plane (P).

6. The egg tray according to claim 1, wherein the grid spacing (D2) is configured such that the second grid prevents an egg from tilting out of the egg accommodation associated with the egg.

7. The egg tray according to claim 1, wherein
an opening of the first grid has an inscribed circle, with an inner diameter ID1,
an opening of the second grid has an inscribed circle, with an inner diameter ID2, and
wherein the ratio between ID1 and ID2 is between 0.4 to 0.6, and wherein the ratio between ID1 and the grid spacing D2 is between 0.7 to 1.7.

8. The egg tray according to claim 1, wherein the egg tray is adapted to receive smaller eggs and larger eggs in the egg accommodations, wherein a first distance (D1) between the first grid and a thickest part of a larger egg is larger than a grid spacing (D2) between the first grid and the second grid, wherein the first distance and the grid distance are defined in a plane perpendicular to the bottom plane (P).

9. The egg tray according to claim 1, wherein the grid spacing (D2) is between 10 mm and 50 mm.

10. The egg tray according to claim 1, wherein the grid spacing (D2) is between 15 mm and 20 mm.

11. The egg tray according to claim 1, wherein the inner diameter ID1 is between 20 to 24 mm and the inner diameter ID2 is between 37 to 47 mm.

12. The egg tray according to claim 1, wherein the egg tray is adapted to only contact the eggs via the ribs.

13. The egg tray according to claim 1, wherein at least one of the ribs comprises a recess that extends between contact faces of the contact area.

14. The egg tray according to claim 13, wherein the recess is configured such the egg is free-standing with respect to the rib.

15. The egg tray according to claim 13, wherein the recess extends between two opposite contact faces of the contact area, and wherein in use an egg contacts both contact faces.

16. A method for incubating a plurality of eggs, the method comprising the steps of:
placing the eggs in a tray, according to claim 1,
tilting the tray with respect to a horizontal.

* * * * *